United States Patent [19]

Takada et al.

[11] Patent Number: 5,708,542
[45] Date of Patent: Jan. 13, 1998

[54] THIN-FILM MAGNETIC HEAD

[75] Inventors: Akio Takada; Takuji Shibata; Tadayuki Honda, all of Miyagi, Japan

[73] Assignee: Sony Corporation, Tokyo, Japan

[21] Appl. No.: 685,611

[22] Filed: Jul. 24, 1996

[30] Foreign Application Priority Data

Jul. 25, 1995 [JP] Japan .................... 7-189307

[51] Int. Cl.$^6$ .................................... G11B 5/39
[52] U.S. Cl. ............................................ 360/113
[58] Field of Search ............................. 360/113

[56] References Cited

U.S. PATENT DOCUMENTS

| | | | |
|---|---|---|---|
| 4,771,349 | 9/1988 | Tsang | 360/113 |
| 5,304,975 | 4/1994 | Saito et al. | 360/113 |
| 5,329,413 | 7/1994 | Kondoh et al. | 360/113 |
| 5,432,734 | 7/1995 | Kawano et al. | 360/113 |
| 5,492,720 | 2/1996 | Gill et al. | 427/131 |
| 5,532,892 | 7/1996 | Nix et al. | 360/113 |

FOREIGN PATENT DOCUMENTS

| | | |
|---|---|---|
| 0 539 213 | 4/1993 | European Pat. Off. |
| 1 539 213 | 4/1993 | European Pat. Off. |

OTHER PUBLICATIONS

Patent Abstracts of Japan, vol. 018, No. 014 (P–1672, Jan. 11, 1994 & JP–A–05 250642 (Toshiba Corp.), Sep. 28, 1993.

Patent Abstracts of Japan, vol. 017, No. 016 (P–1468), Jan. 12, 1993 & JP–A–04 245011 (Hitachi Ltd.), Sep. 1, 1992.

IBM Technical Disclosure Bulletin, *Magnetically Coupled Barberpole MR Head With Built In Longitudinal Bias Structure and Process*, vol. 20, No. 2, Jul. 1977, New York, U.S. pp. 791–793, XP002019916, Anonymous.

*Primary Examiner*—Robert S. Tupper
*Attorney, Agent, or Firm*—Hill, Steadman & Simpson

[57] ABSTRACT

A magnetoresistance effect thin-film magnetic head superior in magnetic stability and capable of developing a high playback power. The thin-film magnetic head has a magnetoresistance effect stabilizing layer 11 inclusive a diamagnetic film or a hard magnetic film, a non-magnetic insulating layer 12 and a magnetoresistance effect layer 13 inclusive of a magnetoresistance effect film, layered together to form a magnetoresistance effect element 3. The thin-film magnetic head also has a non-magnetic insulating layer 4 arranged on a lateral surface of the magnetoresistance effect element 3 and a pair of electrodes connected to the magnetoresistance effect layer 13 on both ends of the upper surface of the magneto-resistance effect element 3. The playback signals are detected by the magnetoresistance effect of the magnetoresistance effect layer 13.

10 Claims, 18 Drawing Sheets

THIN-FILM MAGNETIC HEAD

BACKGROUND OF THE INVENTION

1. Field of the Invention

This invention relates to a magnetoresistance effect type thin-film magnetic head (MR head) suitably used for a hard disc device for detecting playback signals by the magnetoresistance effect.

2. Description of the Related Art

In a magnetic recording device, such as a hard disc device, a higher recording density is demanded for increasing the storage capacity. Recently, a magnetoresistance effect type thin-film magnetic head (MR head), which is a magnetic head suited to narrower track widths, is in widespread use in order to cope with high density magnetic recording.

Basically, the MR head includes two electrodes 102 attached to both ends of a magnetoresistance effect film 101, whose resistivity is changed with the strength of the magnetic field, as shown in FIG. 1. The sense current is supplied to the magnetoresistance effect film 101 from the two electrodes 102 for detecting resistance changes of the magnetoresistance effect film 101 caused by the signal magnetic field from a magnetic recording medium for producing playback outputs based on these resistance changes. Such MR head has a feature that its playback output is not dependent on the speed of the recording medium and a high playback output can be developed even if the speed of the recording medium is low.

Meanwhile, the magnetoresistance effect film usually is magnetically unstable such that the magnetic wall in the magnetoresistance effect film is moved by the external magnetic field. Consequently, the MR head has a drawback that the Barkhausen noise is generated due to movement of the magnetic wall of the magnetoresistance effect film. Thus, with the MR head, it is crucial to achieve magnetic stability of the magnetoresistance effect film to reduce the Barkhausen noise.

For achieving magnetic stability of the magnetoresistance effect film, a so-called double-layer MR head, employing the magnetoresistance effect film a double-layer structure, has been developed. In such double-layer type MR head, in which the magnetoresistance effect film is of a double layer structure, magneto-static coupling is produced between a first magnetoresistance effect film 103 and a second magnetoresistance effect film 105 under a self-bias effect of the sense current supplied to the first magnetoresistance effect film 103 and the second magnetoresistance effect film 105. The result is that the first magnetoresistance effect film 103 and the second magnetoresistance effect film 105 become magnetically stable thus reducing the Barkhausen noise.

However, if the magnetoresistance effect film is of a double layer structure, the self-bias effect cannot operate in a portion of the magnetoresistance effect film carrying the electrodes, that is in the portion of the magnetoresistance effect film other than its magnetically sensitive portion. That is, the self-bias effect cannot be afforded to the portion of the magnetoresistance effect film underlying the electrodes designed to supply the sense current to the magnetoresistance effect film, such that the magnetic wall is liable to be produced in such portion. Thus, even if the double-layer type magnetoresistance effect film is used, the Barkhausen noise is likely to be produced from the portion of the magnetoresistance effect film carrying the electrodes in which the self-bias effect cannot be produced. Therefore, with the MR head, it is crucial to prohibit the magnetic wall from being produced in the magnetoresistance effect film inclusive of the portion thereof carrying the electrodes in order to reduce the Barkhausen noise.

It is also demanded of the MR head to increase the playback output. If the sense current supplied to the magnetoresistance effect film is Is, the variance of resistivity of the magnetoresistance effect film caused by the strength of the magnetic field from the recording medium is Δρ, the length of the magnetically sensitive portion of the magnetoresistance effect film is L, and the cross-sectional area of the magnetically sensitive portion of the magnetoresistance effect film is S, the playback output of the MR head is represented by Is Δρ. Thus, for raising the playback output of the MR head, it suffices if the magnetoresistance effect film is reduced in film thickness for reducing the cross-sectional area S of the magnetically sensitive portion of the magnetoresistance effect film for increasing the current density of the sense current supplied to the magnetoresistance effect film.

However, if the magnetoresistance effect film reduced in thickness excessively, its resistivity is significantly increased. Such increase in resistivity means increased impedance of the magnetoresistance effect film leading to deteriorated characteristics of the MR head. Such increase in resistivity of the magnetoresistance effect film is particularly outstanding in an area thereof having a film thickness of not more than approximately 20 nm. If the magnetoresistance effect film is reduced excessively in thickness, the magnetoresistance effect film tends to become unstable in magnetic characteristics. Thus it is desirable that the film thickness of the magnetoresistance effect film used for an MR head be not less than approximately 20 nm.

However, with the conventional double-layer type MR head, having two layers of magnetoresistance effect films, the total thickness of the magnetoresistance effect films contributing to the playback output is approximately twice that of the MR head having only one magnetoresistance effect film. It is therefore difficult with the conventional double-layer MR head to develop a high playback output.

That is, if, in the conventional double-layer MR head, the film thickness of each magnetoresistance effect film is 20 nm, the total film thickness of the magnetoresistance effect film is 40 nm, thus increasing the cross-sectional area of the magnetically sensitive portion. The result is the lower current density of the sense current and the lower playback output. If the film thickness of each magnetoresistance effect film is set to 10 nm for decreasing the cross-sectional area S of the magnetically sensitive portion, the total film thickness of the magnetoresistance effect films becomes equal to 20 nm, thus decreasing the cross-sectional area S of the magnetically sensitive portion. However, the impedance of the magnetoresistance effect film is increased, while the magnetic characteristics of the magnetoresistance effect film become unstable.

SUMMARY OF THE INVENTION

It is therefore an object of the present invention to provide a thin-film magnetic head employing a magnetoresistance effect film, in which the magnetoresistance effect film is improved in magnetic stability for further stabilizing and improving the playback output.

In one aspect, the present invention provides a thin-film magnetic head including a magneto-resistance effect element having a magnetoresistance effect stabilizing layer inclusive of a hard magnetic layer, a non-magnetic insulating layer and a magnetoresistance effect layer inclusive of a magnetoresistance effect film, layered together, a non-magnetic insulating layer arranged on a lateral surface of the magnetoresistance effect element, and a pair of electrodes connected to the magnetoresistance effect layer on both ends of the upper surface of the magneto-resistance effect element. The playback signals are detected by the magnetoresistance effect of the magnetoresistance effect layer.

In another aspect, the present invention provides a thin-film magnetic head including a magneto-resistance effect element having a magnetoresistance effect stabilizing layer inclusive of a diamagnetic layer, a non-magnetic insulating layer and a magnetoresistance effect layer inclusive of a magnetoresistance effect film, layered together, a non-magnetic insulating layer arranged on a lateral surface of the magnetoresistance effect element, and a pair of electrodes connected to the magnetoresistance effect layer on both ends of the upper surface of the magneto-resistance effect element. The playback signals are detected by the magnetoresistance effect of the magnetoresistance effect layer.

With the thin-film magnetic head of the present invention, magneto-static coupling is produced between the magnetoresistance effect stabilizing layer and the magnetoresistance effect layer for improving magnetic stability of the magnetoresistance effect layer as a magnetically sensitive portion. Moreover, with the present thin-film magnetic head, the electrodes are connected only to the magnetoresistance effect layer, such that only the magnetoresistance effect layer operates as the magnetically sensitive portion. Therefore, with the present thin-film magnetic head, the magnetoresistance effect layer contributing to the playback output can be reduced significantly in thickness as compared with that of the conventional double-layer MR head.

BRIEF DESCRIPTION OF THE DRAWINGS

FIG. 15 is a schematic transverse cross-sectional view showing the process of forming a lower gap layer.

FIG. 16 is a schematic transverse cross-sectional view showing the process of forming a protective layer and a thin-film layer inclusive of a magnetoresistance effect film.

FIG. 17 is a schematic transverse cross-sectional view showing the process of forming a photoresist of a pre-set shape.

FIG. 18 is a schematic transverse cross-sectional view showing the state in which the protective layer and the magnetoresistance effect film have been etched.

FIG. 19 is a schematic transverse cross-sectional view showing the process of forming a non-magnetic insulating layer.

FIG. 20 is a schematic transverse cross-sectional view showing the state in which the photoresist and the non-magnetic insulating layer thereon have been removed.

FIG. 21 is a schematic transverse cross-sectional view showing the state in which the photoresist and the non-magnetic insulating layer thereon have been removed.

FIG. 22 is a schematic transverse cross-sectional view showing the process of forming a non-magnetic insulation layer and an aperture.

FIG. 23 is a schematic transverse cross-sectional view showing the process of forming a conductor layer for the sense current, a conductor layer for the bias current and a non-magnetic insulating layer.

FIG. 24 is a schematic transverse cross-sectional view showing the process of forming an upper gap layer and an upper layer shield.

FIG. 25 is a schematic front view showing the state in which a photoresist has been formed on the lower gap layer, the magnetoresistance effect element and on the protective layer.

FIG. 26 shows the step next to the step of FIG. 25 and shows the state in which the photoresist has been formed on the non-magnetic insulating layer.

FIG. 27 shows the step next to the step of FIG. 26 and shows the state in which the surface has been planarized by etchback.

DESCRIPTION OF THE PREFERRED EMBODIMENTS

Figure 1:
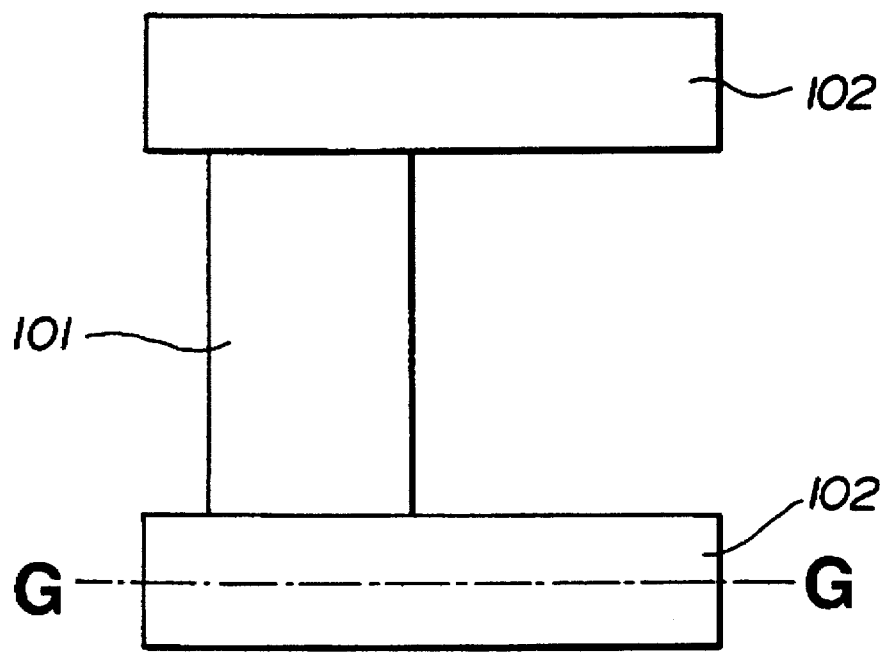
FIG. 1 is a cross-sectional view showing a basic structure of an MR head.

Referring to the drawings, preferred embodiments of the present invention will be explained in detail. The present invention is, however, not limited to these specific embodiments, but may comprise optional modifications as to the shape or the material type without departing from the scope of the invention.

Figure 3:
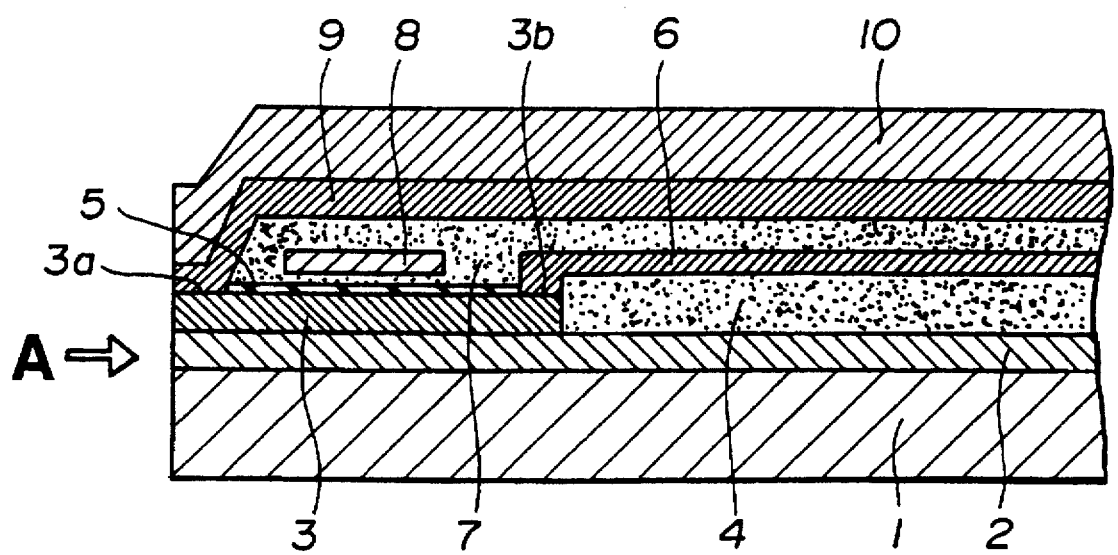
FIG. 3 is a transverse cross-sectional view showing essential portions of an illustrative MR head according to the present invention.

Referring to FIG. 3, the thin-film magnetic head embodying the present invention is an MR head having a magnetoresistance effect film including a magnetoresistance effect stabilizing layer. The MR head includes a lower shield layer 1 and a lower gap layer 2 formed on the lower shield layer 1. The MR head also includes a magnetoresistance effect element 3 and a non-magnetic insulating layer 4 formed on a lower gap layer 2. The MR head also includes a protective layer 5 formed on the portion of the magnetoresistance effect element 3 other than that on a leading end 3a and a trailing end 3b thereof, and a conductor layer for the sense current 6 formed on the trailing end 3b of the magnetoresistance effect element 3 onto above the non-magnetic insulating layer 4 for connection to the trailing end 3b of the magnetoresistance effect element 3. The MR head also includes a non-magnetic insulating layer 7 formed on the magnetoresistance effect element 3 and on the conductor layer for the sense current 6, and a conductor layer for the bias current 6 formed in the non-magnetic insulating layer 7 for overlying the magnetoresistance effect element 3. The MR head also includes an upper gap layer 9 formed from above the leading end 3a of the magnetoresistance effect element 3 to above the non-magnetic insulating layer 7 and an upper shield layer 10 formed on the upper gap layer 9.

In the above MR head, the lower shield layer 1 and the lower shield layer 10 are formed of a magnetic material and the lower gap layer 2 is formed of a non-magnetic insulating material, while the upper gap layer 9 is formed of a non-magnetic electrically conductive material. The lower shield layer 1, upper shield layer 10, lower gap layer 2 and the upper gap layer 9 operate for preventing the magnetic field other than that to be reproduced from being seized by the magnetoresistance effect element 3. That is, since the lower shield layer 1 and the upper shield layer 10 are disposed above and below the magnetoresistance effect film via the lower gap layer 1 and the upper gap layer 9, the signal magnetic field from the magnetic recording medium other than that to be reproduced is conducted to the lower shield layer 1 and the upper shield layer 10, while only the magnetic field to be reproduced in seized by the magnetoresistance effect element 3.

The conductor layer for the sense current 6 and the upper gap layer 9 become a pair of electrodes connected to both ends of the magnetoresistance effect element 3, and operate for supplying the sense current to the magnetoresistance effect element 3. Specifically, the trailing end 3b and the leading end 3a of the magnetoresistance effect element 3 are electrically connected to the conductor layer for the sense current 6 and to the upper gap layer 9, respectively. In detecting the signal magnetic field from the magnetic recording medium, the sense current is supplied via these layers to the magnetoresistance effect element 3. The magnetoresistance effect element 3 is made up of a magnetoresistance effect stabilizing layer, a non-magnetic insulating layer and a magnetoresistance effect layer, layered together, as later explained. The sense current is supplied only to the magnetoresistance effect layer.

The conductor layer for the bias current 6, formed in the non-magnetic insulating layer 7 for overlying the magnetoresistance effect element 3, is used for applying the bias magnetic field across the magnetoresistance effect film 3. That is, when detecting the signal magnetic field from the magnetic recording medium, the current is caused to flow through the conductor layer for the bias current 6 for impressing the bias magnetic field across the magnetoresistance effect element 3 for achieving a higher magnetoresistance effect.

Figure 2:
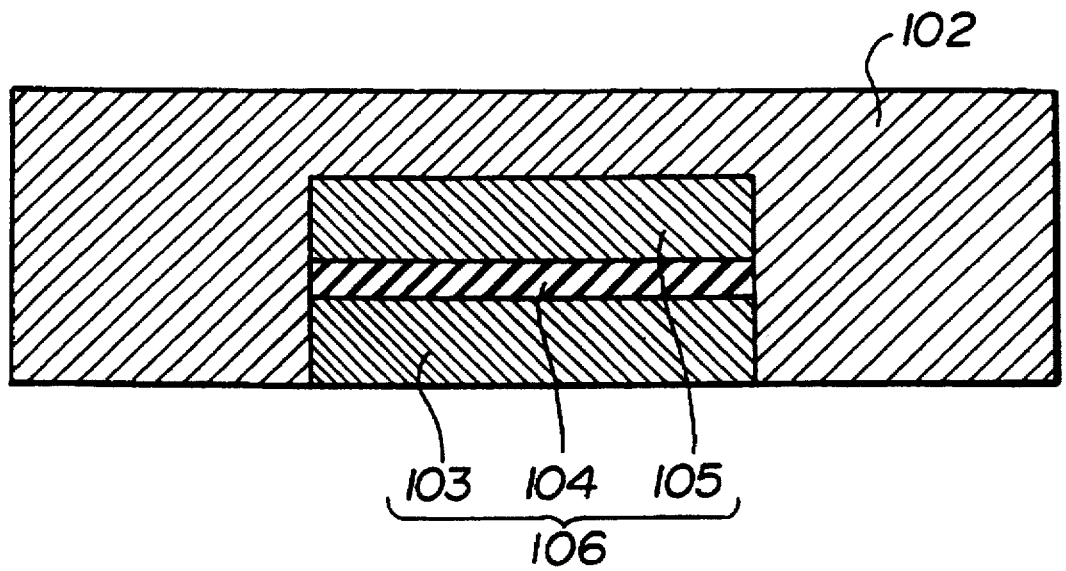
FIG. 2 is a cross-sectional view showing the structure of a conventional magnetoresistance effect film of a double-layer MR head.
Figure 4:
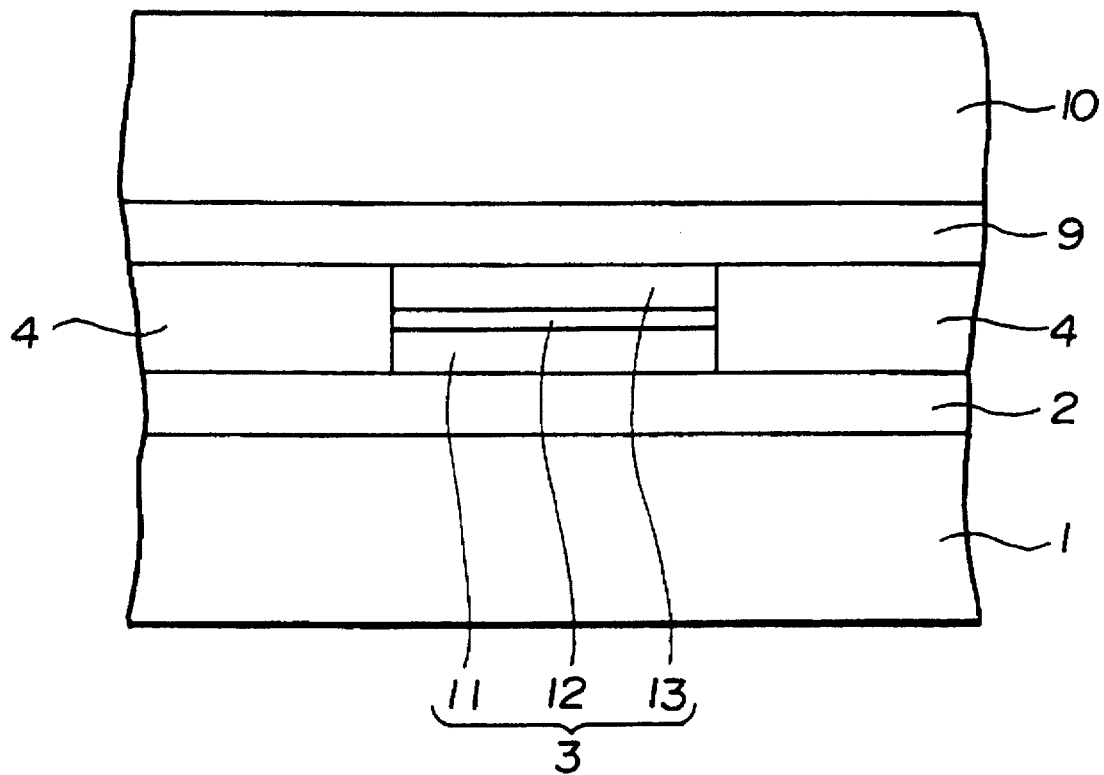
FIG. 4 is a front view showing essential portions of the MR head shown in FIG. 1, looking from the surface thereof along which runs a recording medium.

FIG. 2 shows such MR head looking from the surface thereof along which runs the magnetic recording medium, as shown by arrow A in FIG. 3. The magnetoresistance effect element 3 is comprised of a magnetoresistance effect stabilizing layer 11, a non-magnetic insulating layer 12 and a magnetoresistance effect layer 13, layered together, as shown in FIG. 4. The magnetoresistance effect layer 13 is fed with the sense current, as described above, and operates as a magnetically sensitive portion for detecting the signals from the recording medium. The magnetoresistance effect stabilizing layer 11 is magneto-statically coupled with the magnetoresistance effect layer 13 for operating as a magnetically sensitive portion for detecting the signal from the recording medium. On the other hand, the magnetoresistance effect stabilizing layer 11 is magneto-statically coupled with the magnetoresistance effect layer 13 for contributing to improving magnetic stability of the magnetoresistance effect layer 13.

On both lateral sides of the magnetoresistance effect stabilizing layer 11 are arranged the non-magnetic insulating layers 4, so that the magnetoresistance effect element 3 is buried in this non-magnetic insulating layer 4. The non-magnetic insulating layer 4 is exposed on the surface of the MR head along which slides the magnetic recording medium and hence is preferably formed of a material superior in sliding characteristics, such as $Al_2O_3$, $SiO_2$ or $SiN_x$, such as $Si_3N_4$.

The magnetoresistance effect layer 13 and the electrodes are connected at either ends on the upper surface of the magnetoresistance effect element 3. Specifically, the upper surface of the magnetoresistance effect layer 13 and the upper gap layer 9 are electrically connected at the leading end 3a of the magnetoresistance effect film 3, as shown in FIGS. 3 and 4, while the upper surface of the magnetoresistance effect layer 13 and the conductor layer for the sense current 6 are electrically connected to each other at the trailing end 3b of the magnetoresistance effect film 3, as shown in FIG. 1. The magnetoresistance effect stabilizing layer 11 has its lateral surface and its upper surface insulated by the non-magnetic insulating layer 4 and by the non-magnetic insulating layer 12, respectively, so that no sense current is allowed to flow through the stabilizing layer 11.

With the MR head, employing the magnetoresistance effect element 3, since the magnetoresistance effect layer 13 is magnetically coupled with the magnetoresistance effect stabilizing layer 11, the magnetoresistance effect layer 13 is improved in magnetic stability, thus reducing the Barkhausen noise.

Moreover, with the present MR head, the sense current is supplied only to the magnetoresistance effect layer 13 and only the magnetoresistance effect layer 13 operates as a magnetically sensitive portion. Therefore, with the present MR head, the thickness contributing to the playback output is solely the thickness of the magnetoresistance effect layer 13. Thus, with the present MR head, the thickness of the portion contributing to the playback output may be reduced to one-half of that with the conventional double-layer MR head. By reducing the thickness of the magnetoresistance effect layer 13 contributing to the playback output, the current density of the sense current may be increased, thus enabling the high playback output of the MR head to be produced.

The magnetoresistance effect element 3 employed in such MR head is explained in further detail.

The magnetoresistance effect element 3 is comprised of the magnetoresistance effect stabilizing layer 11, the non-magnetic insulating layer 12 and the magnetoresistance effect layer layered together, as explained above.

The non-magnetic insulating layer 12 disposed between the magnetoresistance effect stabilizing layer 11 and the magnetoresistance effect layer 13 needs only be formed of an electrically insulating non-magnetic material, such as $Al_2O_3$. Although a thinner film thickness of the magnetoresistance effect stabilizing layer 11 is preferred for reducing the gap width, it is necessary for the non-magnetic insulating layer 12 to have a film thickness not less than approximately 10 nm in view of the necessity for maintaining insulation between the magnetoresistance effect stabilizing layer 11 and the magnetoresistance effect layer 13.

The magnetoresistance effect layer 13, on the other hand, needs only to have a magnetoresistance effect film exhibiting the magnetoresistance effect. Thus it may be comprised only of the magnetoresistance effect film, such as NiFe, or comprised of the magnetoresistance effect film, such as NiFe, formed on an underlaying layer formed e.g., of Ta.

For forming the magnetoresistance effect layer, formed of NiFe, on the underlying film formed e.g., of Ta, the magnetoresistance effect film may have (111) orientation for lowering the resistivity of the magnetoresistance effect film. Since the lowering of the resistivity of the magnetoresistance effect film means the lowering of the impedance of the magnetoresistance effect film, as explained previously, the playback output of the MR head may be improved by providing such underlying layer.

Figure 5:
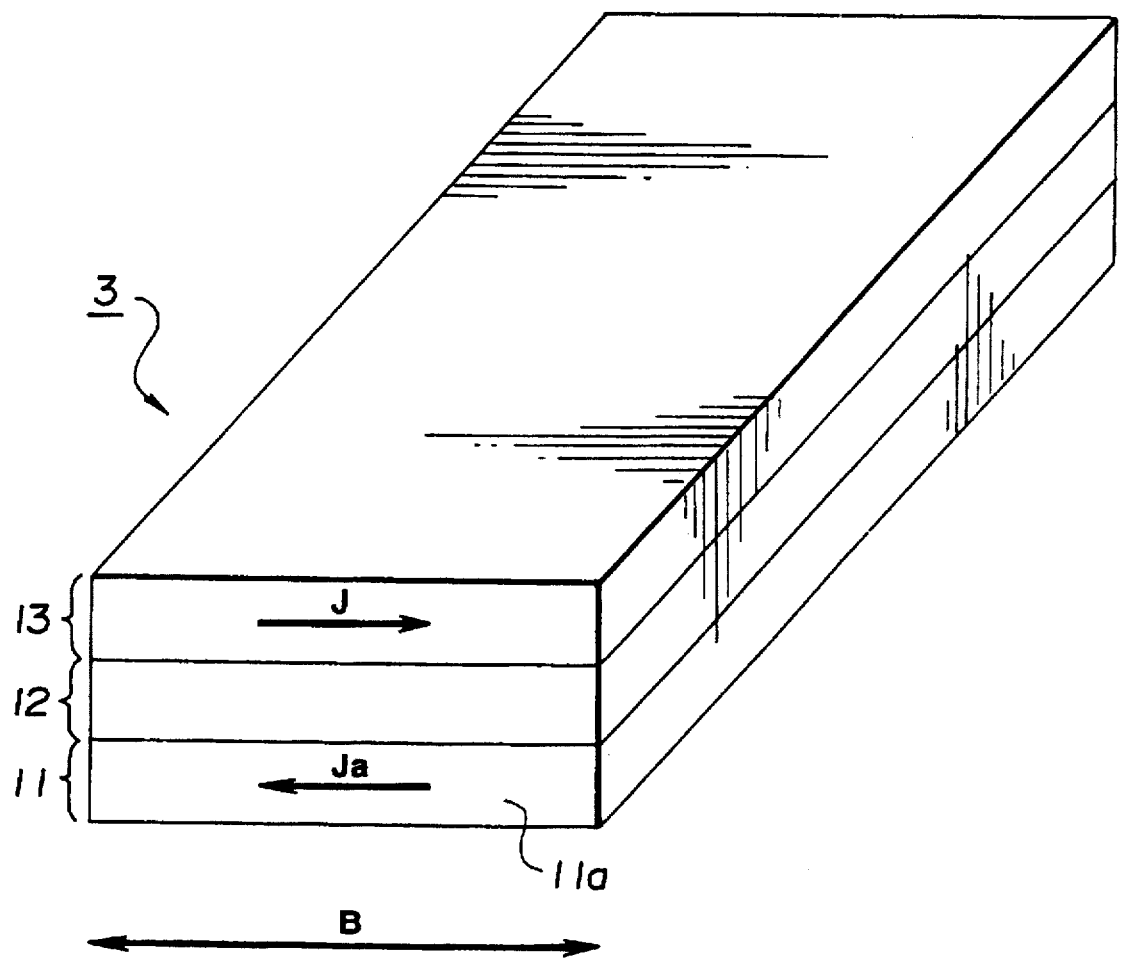
FIG. 5 is a perspective view showing an illustrative magnetoresistance effect film employed in the MR head shown in FIG. 1.
Figure 6:
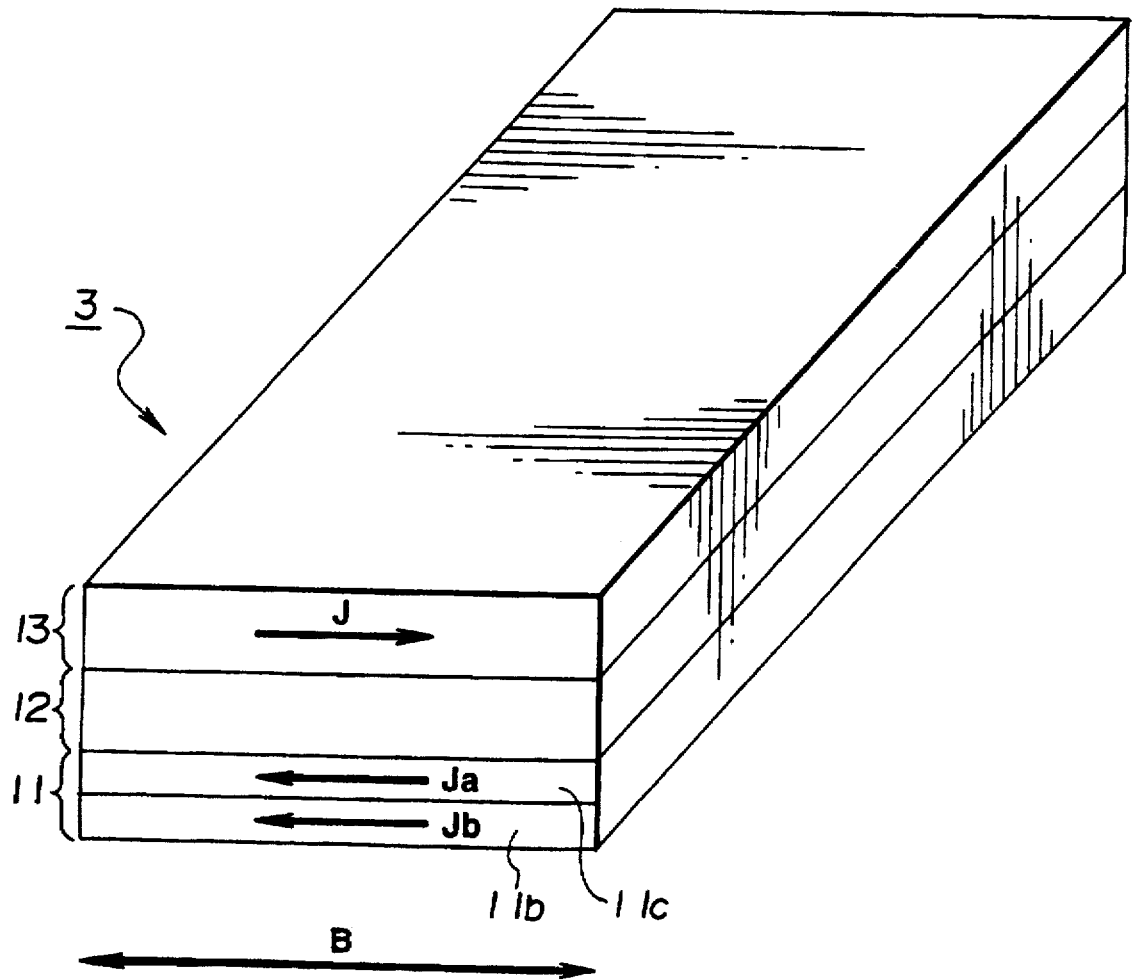
FIG. 6 is a perspective view showing another illustrative magnetoresistance effect film employed in the MR head shown in FIG. 1.
Figure 7:
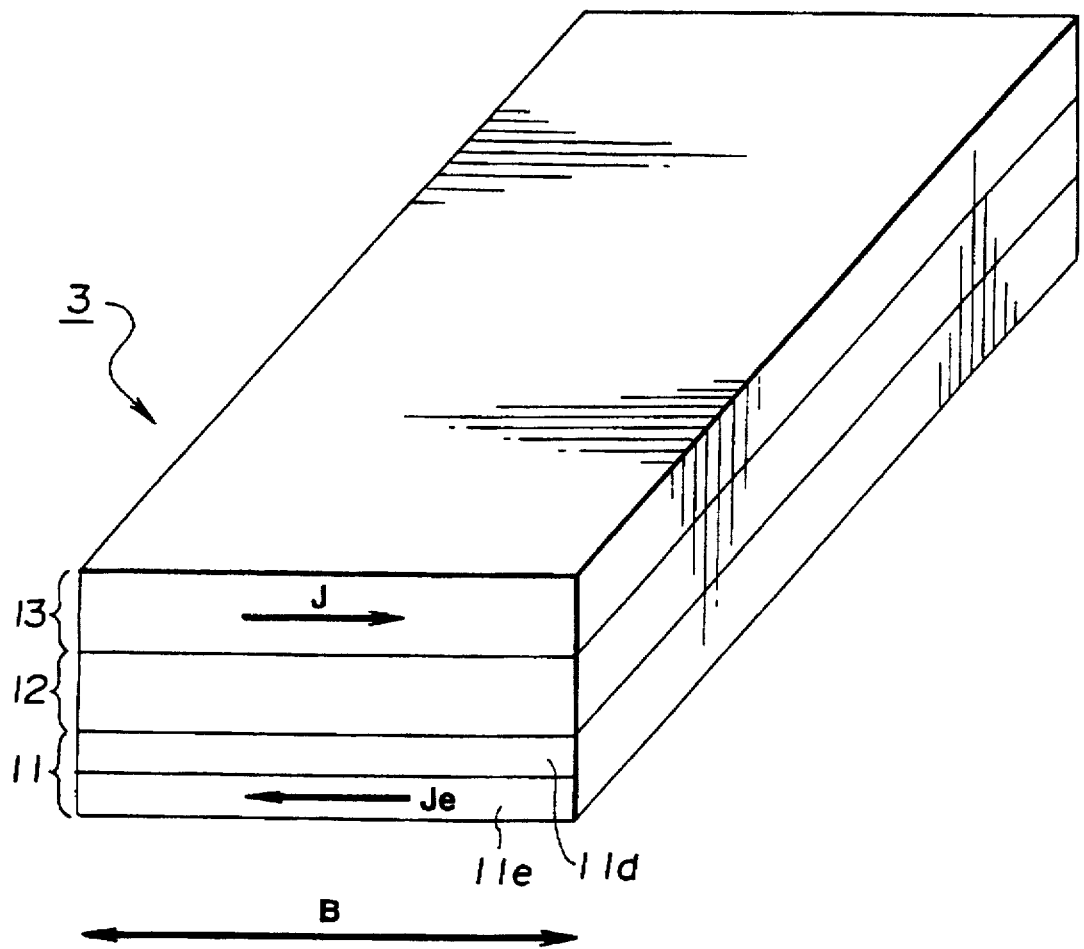
FIG. 7 is a perspective view showing still another illustrative magnetoresistance effect film employed in the MR head shown in FIG. 1.
Figure 8:
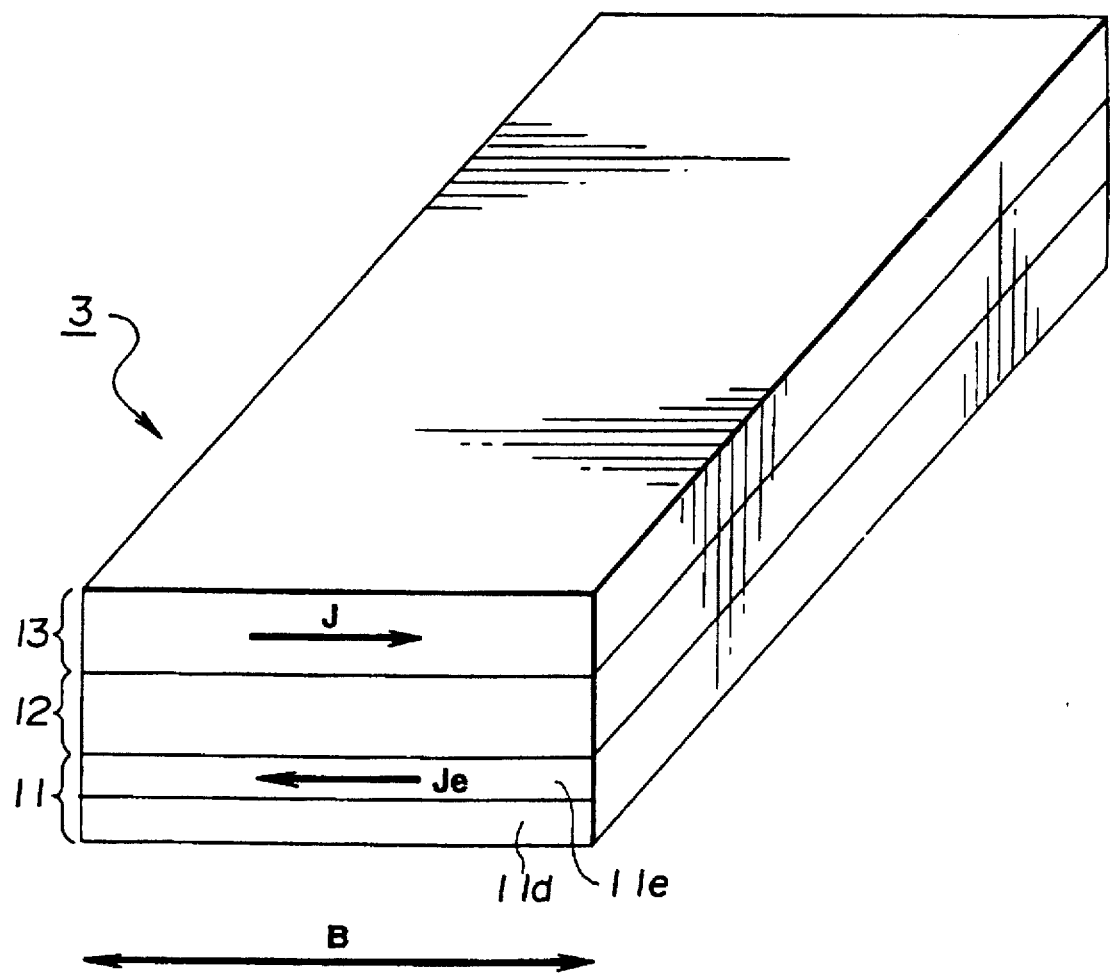
FIG. 8 is a perspective view showing yet another illustrative magnetoresistance effect film employed in the MR head shown in FIG. 1.

The magnetoresistance effect stabilizing layer 11 is a layer used for improving magnetic stability of the magnetoresistance effect layer 13 and it suffices if the layer 11 is capable of producing the magnetostatic coupling action with respect to the magnetoresistance effect layer 13. Thus the magnetoresistance effect stabilizing layer 11 may be formed only by a hard magnetic film 11a of, for example, CoPt, CoPtCr or CoNi, as shown in FIG. 5. Alternatively, it may be formed by a hard magnetic film 11b of, for example, CoPt, CoPtCr or CoNi and a soft magnetic film 11c formed of a soft magnetic film, such as NiFe or NiFe-X, where X is ta, Cr or Nb, layered together, as shown in FIG. 6. Still alternatively, it may be comprised of a diamagnetic film 11d formed e.g., of FeMn or NiO, and a magnetic film 11e, formed e.g., of Co, NiFe or NiFe-X, where X is Ta, Cr or Nb, layered together, as shown in FIGS. 7 and 8.

If the magnetoresistance effect stabilizing layer 11 is a hard magnetic layer 11a, as shown in FIG. 3, the hard magnetic film 11a, magnetized so that the direction of magnetization Ja corresponds to the track width direction B, is used so that the static magnetic field will be produced by the hard magnetic film 11a in the track width direction B of the MR head. Thus, by the magnetostatic coupling with the magnetoresistance effect stabilizing layer 11 formed by the hard magnetic film 11a having the direction of magnetization Ja corresponding to the track width direction B, the direction of magnetization J of the magnetoresistance effect layer 13 is also aligned with the track width direction B, such that the magnetoresistance effect layer 13 is of the sole magnetic domain. The result is that the magnetoresistance effect layer 13 operates stably without the noise being generated due to, for example, magnetic wall movement.

If the magnetoresistance effect stabilizing layer 11 is the hard magnetic layer 11b and the soft magnetic layer 11c layered together, as shown in FIG. 4, the hard magnetic film 11b, magnetized so that the direction of magnetization Jb corresponds to the track width direction, is used so that the static magnetic field will be produced by the hard magnetic film 11b and the soft magnetic film 11c in the track width direction B of the MR head. At this time, the direction of magnetization Jc of the soft magnetic film 11c is the same as the direction of magnetization Jb of the hard magnetic film 11b by the exchange operation, so that the soft magnetic film 11c operates for producing magnetic coupling with respect to the magnetic pole of the hard magnetic film 11b and the magnetoresistance effect layer 13. This causes the direction of magnetization J of the magnetoresistance effect layer 13 to be aligned with the track width direction B so that the magnetoresistance effect layer 13 is of the sole magnetic domain. The result is that the magnetoresistance effect layer 13 operates stably without the noise being generated due to, for example, magnetic wall movement.

In general, if the hard magnetic film is magnetized in the film plane direction, it is difficult to align the direction of magnetization of the hard magnetic film completely in the plane direction, such that some components of magnetization are not aligned in the plane direction. Therefore, the components of magnetization perpendicular to the hard magnetic film 11b are usually contained in the components of magnetization of the film 11b. These perpendicular components of the magnetization represent the factors detrimental to the magnetic stability of the magnetoresistance effect layer 13. However, by constituting the magnetoresistance effect stabilizing layer 11 by the hard magnetic film 11b and the soft magnetic film 11c, the perpendicular components of magnetization of the hard magnetic film 11b are interrupted by the soft magnetic film 11c, thus eliminating the factors otherwise producing magnetic instabilities in the magnetoresistance effect layer 13.

If the magnetoresistance effect stabilizing layer 11 is formed by the diamagnetic film 11d and the magnetic film 11e, layered together, as shown in FIGS. 7 and 8, the direction of magnetization Je of the magnetic film 11e is fixed by the exchange operation of the diamagnetic film 11e and the magnetic film 11e. The direction of magnetization Je of the magnetic film 11e is fixed so as to correspond to the track width direction B of the MR head. For fixing the direction of magnetization Je in this manner, it suffices to form the diamagnetic film 11d in a pre-set magnetic field, or to perform annealing in a pre-set magnetic field after formation of the diamagnetic film 11d. By fixing the direction of magnetization Je of the magnetic film 11e in this manner in the track width direction B, the direction of magnetization J of the magnetoresistance effect layer 13 is also aligned with the track width direction B by the magnetostatic coupling effect between the magnetoresistance effect stabilizing layer 11 and the magnetoresistance effect layer 13, so that the magnetoresistance effect layer 13 is of the sole magnetic domain. The result is that the magnetoresistance effect layer 13 operates stably without the noise being generated due to, for example, magnetic wall movement. If the magnetoresistance effect stabilizing layer 11 is made up in this manner of the diamagnetic film 11d and the magnetic film 11e, layered together, the diamagnetic film 11d may be layered on the magnetic film 11e, as shown in FIG. 7, or the magnetic film 11e may be layered on the diamagnetic film 11d, as shown in FIG. 8.

The sensitivity of the magnetoresistance effect film 3 having the magnetoresistance effect stabilizing layer 11 is now explained in comparison with that of the conventional double-layered magnetoresistance effect element.

Figure 9:
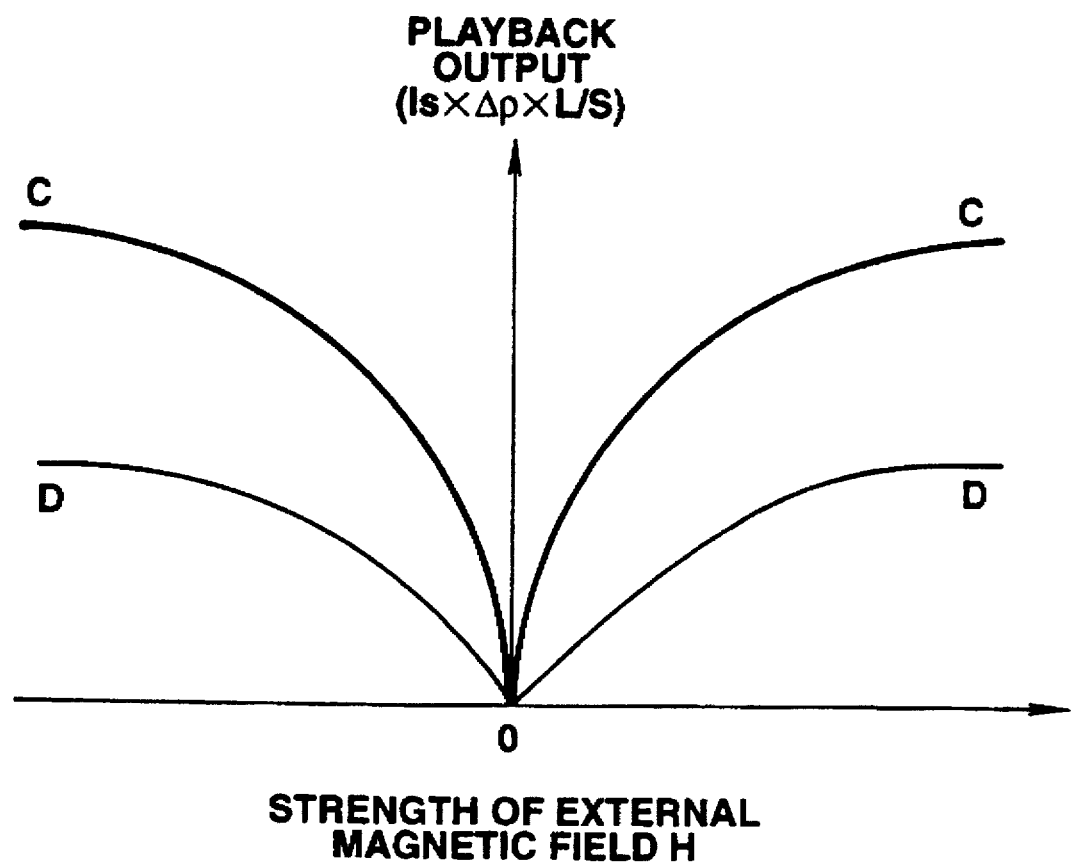
FIG. 9 is a graph showing the relation between the playback output of the magnetoresistance effect film and the strength of the external magnetic field by way of comparison of a magnetoresistance effect film having a magnetoresistance effect stabilizing layer and a conventional magnetoresistance effect element.

If the film thickness of the magnetoresistance effect layer 13 of the magnetoresistance effect film 3 is set so as to be equal to that of the magnetoresistance effect film of the dual layer magnetoresistance effect element, no sense current flows in the magnetoresistance effect stabilizing layer 11 of the magnetoresistance effect element 3, so that the cross-sectional area S of the portion of the magnetoresistance effect element 3 through which flows the sense current is one-half the cross-sectional area S of the portion of the double-layer magnetoresistance effect element through which flows the sense current. Thus the current density of the sense current flowing through the magnetoresistance effect element 3 is approximately twice that of the sense current flowing through the double-layer magnetoresistance effect element. The result is that, for the same amount of the sense current, the playback output C by the magnetoresistance effect film 3 is approximately twice the playback output D by the conventional double-layer magnetoresistance effect element, as shown in FIG. 9.

Meanwhile, the sensitivity of the magnetoresistance effect layer 13 is represented by $\Delta V/H$, where $\Delta V$ is a change in voltage across the electrodes connected to both ends of the magnetoresistance effect layer 13 produced by resistance changes and H is the strength of the external magnetic field. The larger the ratio value, the higher becomes the sensitivity of the magnetoresistance effect layer 13. However, with the conventional double-layer magnetoresistance effect element, it has not been possible to control the sensitivity since the latter is determined by the self-bias effect by the sense current. Conversely, with the magnetoresistance effect film 3, the strength of the magnetic energy supplied to the magnetoresistance effect layer 13 can be controlled by varying the film thickness or the material type of the magnetoresistance effect stabilizing layer 11 or by varying the film thickness of the non-magnetic insulating layer 12. Thus it is possible with the magnetoresistance effect film 3 to control the magnetic energy so that an optimum magnetic energy will be supplied to the magnetoresistance effect layer 13 for thereby improving the sensitivity of the magnetoresistance effect stabilizing layer 11.

With the magnetoresistance effect element, employing the magnetoresistance effect stabilizing layer 11, in distinction from the double-layer magnetoresistance effect element employing the self-bias effect, the magnetic energy is supplied even to both end portions of the magnetoresistance effect layer 13 designed for carrying the electrodes, for thereby stabilizing the magnetoresistance effect layer 13. Thus, by using the magnetoresistance effect stabilizing layer 11, it becomes possible to stabilize the magnetoresistance effect layer 13 inclusive of the electrode mounting portions.

With the above-described magnetoresistance effect film 3, it is desirable that the magnetoresistance effect stabilizing layer 11 and the magnetoresistance effect layer 13 be magneto-statically coupled to each other for magnetically stabilizing the magnetoresistance effect layer 13 operating as the magnetically sensitive portion of the MR head. However, if the magnetostatic coupling between the magnetoresistance effect stabilizing layer 11 and the magnetoresistance effect layer 13 is weak, the magnetoresistance effect layer 13 is not magnetically stabilized sufficiently. The strength of the magneto-static coupling depends on the ratio of the amount of the total saturation magnetic flux $\phi 1$ of the magnetoresistance effect stabilizing layer 11 to the amount of the total saturation magnetic flux $\phi 2$ of the magnetoresistance effect layer 13. In this consideration, the relation between the above ratio and the magnetoresistance effect of the magnetoresistance effect layer 13 was checked. The results are shown in FIGS. 10 to 13.

Figure 10:
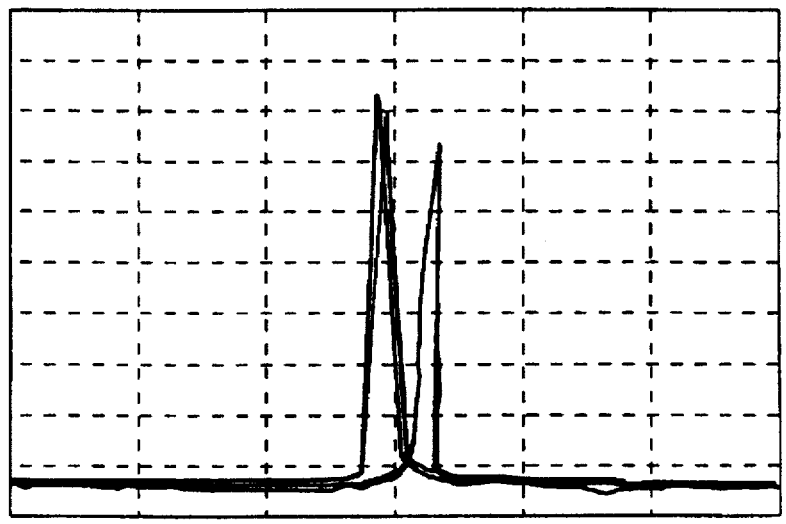
FIG. 10 is a graph showing the results of measurement of the magnetoresistance effect of the magnetoresistance effect film for the ratio of the total saturation magnetic flux density $\phi 1$ of the magnetoresistance effect stabilizing layer to the total saturation magnetic flux density $\phi 2$ of the magnetoresistance effect layer ratio of 0.50:1.
Figure 11:
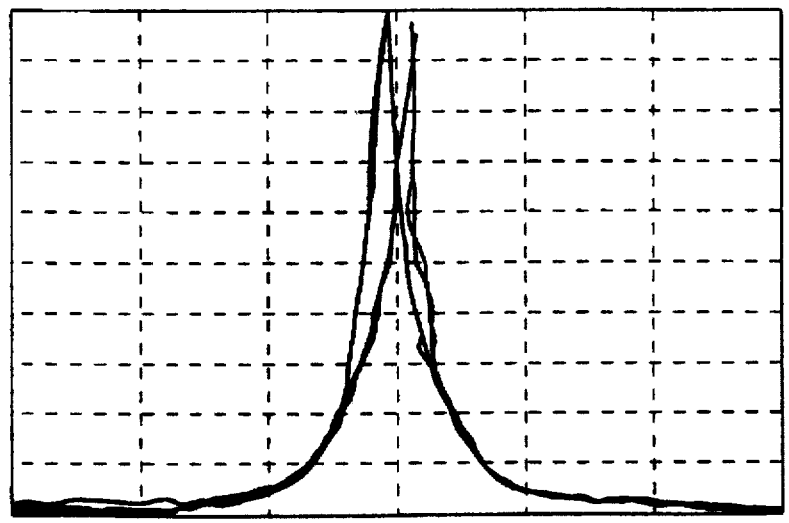
FIG. 11 is a graph showing the results of measurement of the magnetoresistance effect of the magnetoresistance effect film for the ratio of the ratio of the total saturation magnetic flux density $\phi 1$ of the magnetoresistance effect stabilizing layer to the total saturation magnetic flux density $\phi 2$ of the magnetoresistance effect layer ratio of 0.75:1.
Figure 12:
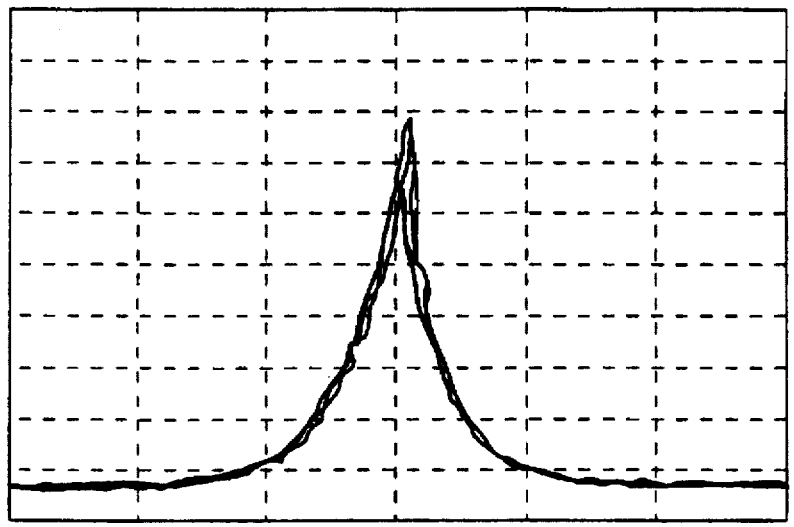
FIG. 12 is a graph showing the results of measurement of the magnetoresistance effect of the magnetoresistance effect film for the ratio of the total saturation magnetic flux density $\phi 1$ of the magnetoresistance effect stabilizing layer to the total saturation magnetic flux density $\phi 2$ of the magnetoresistance effect layer ratio of 1:1.
Figure 13:
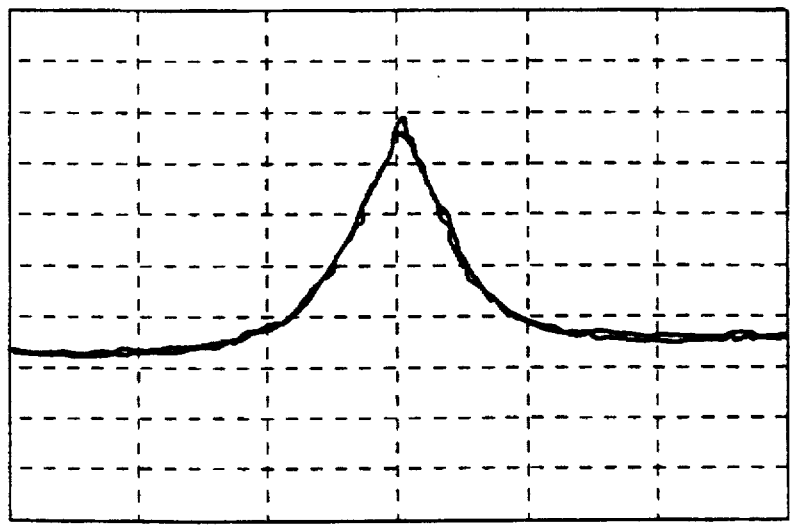
FIG. 13 is a graph showing the results of measurement of the magnetoresistance effect of the magnetoresistance effect film for the ratio of the total saturation magnetic flux density $\phi 1$ of the magnetoresistance effect stabilizing layer to the total saturation magnetic flux density $\phi 2$ of the magnetoresistance effect layer ratio of 1.25:1.

FIG. 10 showing the magnetoresistance effect of the magnetoresistance effect layer 13 for the ratio of the total saturation magnetic flux density $\phi 1$ of the magnetoresistance effect stabilizing layer 11 to the total saturation magnetic flux density $\phi 2$ of the magnetoresistance effect layer 13 of 0.50:1. FIGS. 11 to 13 shows the same magnetoresistance effect for the values of the above ratio of 0.75:1, 1:1 and 1.25:1, respectively. In FIGS. 10 to 13, the abscissa and the ordinate denote the strength H of the external magnetic field and the rate of change of resistivity $\Delta \rho/92$ of the magnetoresistance effect layer 13 by the magnetoresistance effect, respectively.

As may be seen from FIGS. 10 to 13, the waveform of the magnetoresistance effect undergoes significant hysteresis for $\rho 1/\rho 2 < 1$, while remaining stable for $\rho 1/\rho 2 \geq 1$. That is, for a larger value of the total saturation magnetic flux $\phi 1$ of the magnetoresistance effect stabilizing layer 11, the magnetoresistance effect of the magnetoresistance effect layer 13 is stable, while the noise is reduced.

The relation between the total saturation magnetic flux density $\phi 1$ of the magnetoresistance effect stabilizing layer 11 and the total saturation magnetic flux density $\phi 2$ of the magnetoresistance effect layer 13 is now explained.

Figure 14:
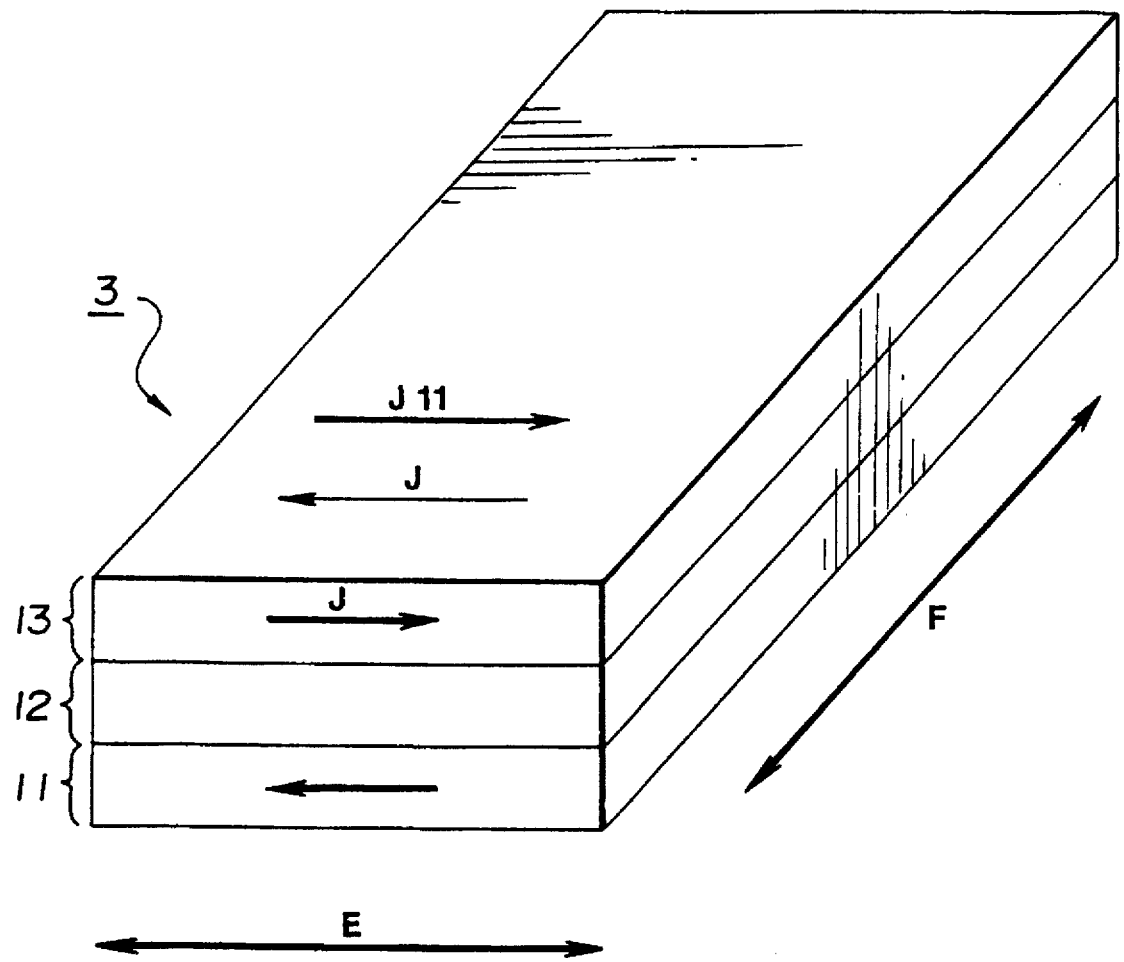
FIG. 14 is a schematic perspective view showing the state of the magnetic field for a magnetoresistance effect film having a magnetoresistance effect stabilizing layer.

As the track width becomes smaller, the shape of the magnetoresistance effect element 3 is such that the length F of the magnetoresistance effect element 3 in a direction perpendicular to the track width direction E of the MR head, that is along the depth of the element 3, is longer than the length E thereof along the track width direction E, as shown in FIG. 14. The length of the element along the depth of the element 3 is referred to hereinafter as the length along the direction of the magnetically sensitive portion. In this magnetoresistance effect element 3, it is preferred that the direction of magnetization J of the magnetoresistance effect layer 13 be fully aligned with the track width direction E. It is however liable to be oriented by shape anisotropy along the direction of the magnetically sensitive portion F. This is ascribable to the diamagnetic field j, equal to the amount of total saturation magnetic flux of the magnetoresistance effect layer 13, and which is generated along the track width direction E. With the above magnetoresistance effect element 3, this diamagnetic field j is canceled by the magnetic field J11 produced by the magnetic flux emanating from the magnetoresistance effect stabilizing layer 11.

However, with $\phi 1 < \phi 2 < 1$, the diamagnetic field j cannot be canceled satisfactorily, so that the direction of magnetization J of the magnetoresistance effect layer 13 is oriented along the direction of the magnetically sensitive portion F, as a result of which the above-mentioned hysteresis is produced. For $\phi 1/\phi 2 = 1$, the diamagnetic field j should be canceled theoretically. However, due to fluctuations produced at the time of film formation, some hysteresis may be left. It is therefore desirable that the relation between the total saturation magnetic flux density $\phi1$ of the magnetoresistance effect stabilizing layer 11 and the total saturation magnetic flux density $\phi2$ of the magnetoresistance effect layer 13 be such that $\phi1/\phi2>1$.

For realizing the above relation $\phi1/\phi2>1$, it is sufficient if the film thickness of the magnetoresistance effect stabilizing layer 11 be selected to be larger than the film thickness of the magnetoresistance effect layer 13, or if the magnetoresistance effect stabilizing layer 11 be formed of a material having a larger value of the magnetic flux density Bs.

The method for producing the above-described MR head is now explained in detail.

Figure 15:
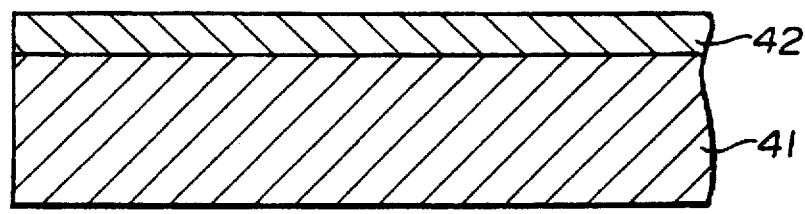
FIGS. 15 to 24 sequentially illustrate the production process of the MR head shown in FIG. 1, where

For producing the above MR head, a lower gap layer 42 formed of a non-magnetic insulating material, such as $Al_2O_3$, is formed on the lower shield layer 41, as shown in FIG. 15. The lower gap layer 42 electrically insulates the lower portion of the magnetoresistance effect element formed by the subsequent step and forms a magnetic gap below the magnetoresistance effect element.

Figure 16:
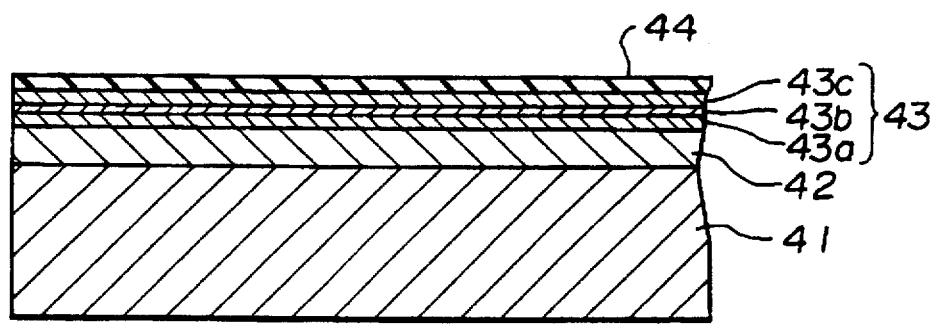

Then, as shown in FIG. 16, a thin film layer 43, including the magnetoresistance effect element, is formed on the lower gap layer 42, and a protective layer 44 formed of $Al_2O_3$ is formed on the thin film layer 43. This thin film layer 43 is etched during the subsequent step to form the magnetoresistance effect element and is comprised of a magnetoresistance effect stabilizing layer 43a, a non-magnetic insulating layer 43b, formed of $Al_2O_3$, an underlaying layer formed of Ta, and a magnetoresistance effect layer 43c comprised of a NiFe film, layered together.

Figure 17:
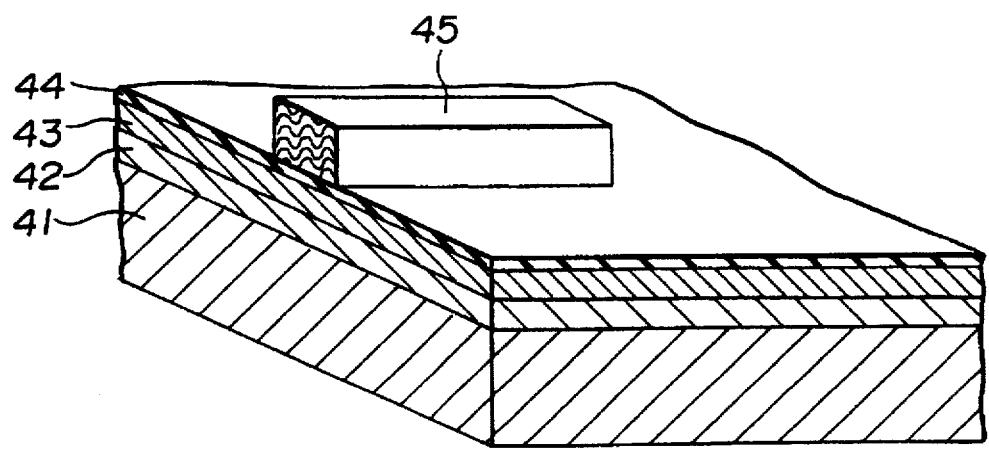
Figure 18:
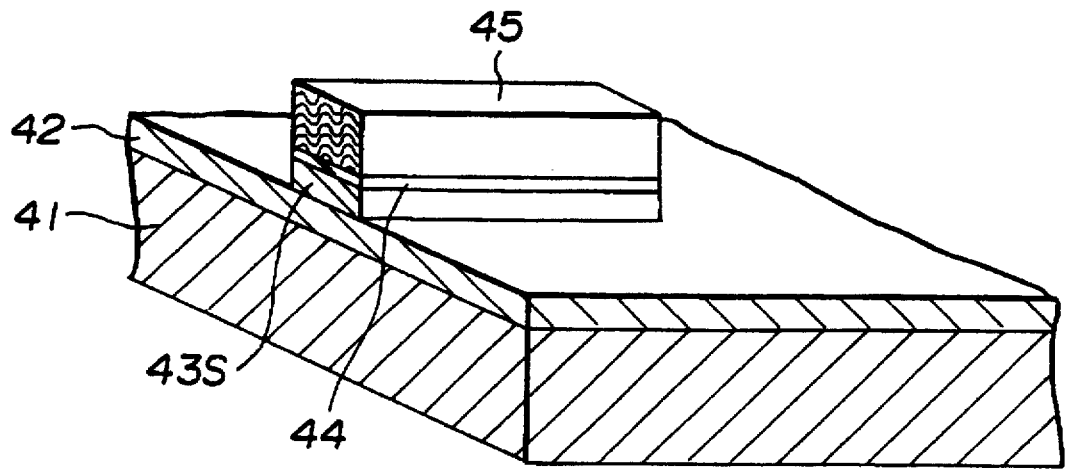

For processing the thin-film layer 43 to a magnetoresistance effect element of a pre-set shape, a photoresist 45 patterned to a pre-set shape is formed on the protective layer 44, as shown in FIG. 17, after which the protective layer 44 and the thin-film layer 43 are etched to form a magnetoresistance effect element 43S of a pre-set shape, having the protective layer 44 formed thereon, as shown in FIG. 18.

By previously forming the thin-film layer 43, inclusive of the magnetoresistance effect element, and subsequently forming the magnetoresistance effect element 43S of a pre-set shape by etching, the relative position of the magnetoresistance effect stabilizing layer 43a is brought into full coincidence with that of the magnetoresistance effect layer 43c. Thus, with such magnetoresistance effect element 43S, ideal magnetostatic coupling may be realized between the magnetoresistance effect stabilizing layer 43a and the magnetoresistance effect layer 43c.

Figure 19:
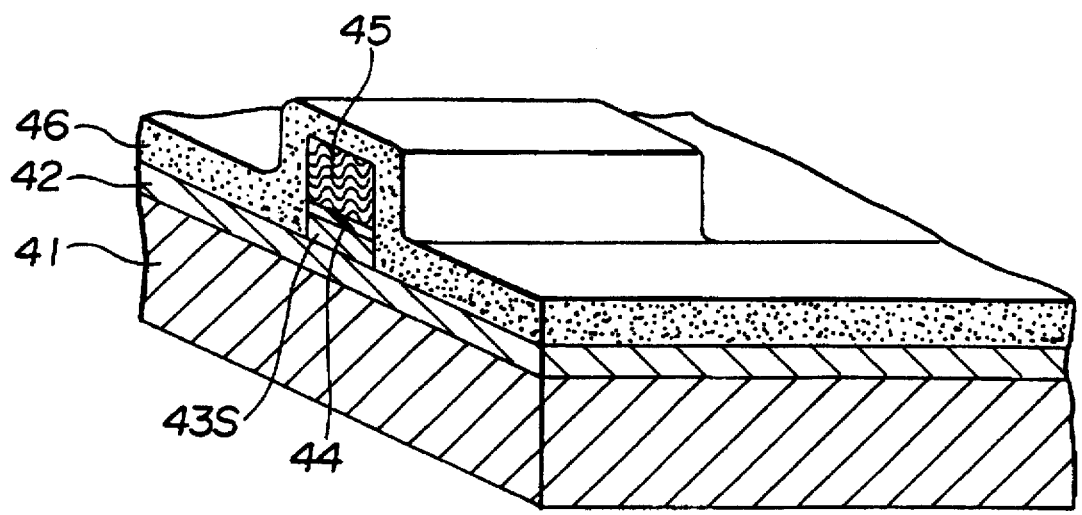
Figure 20:
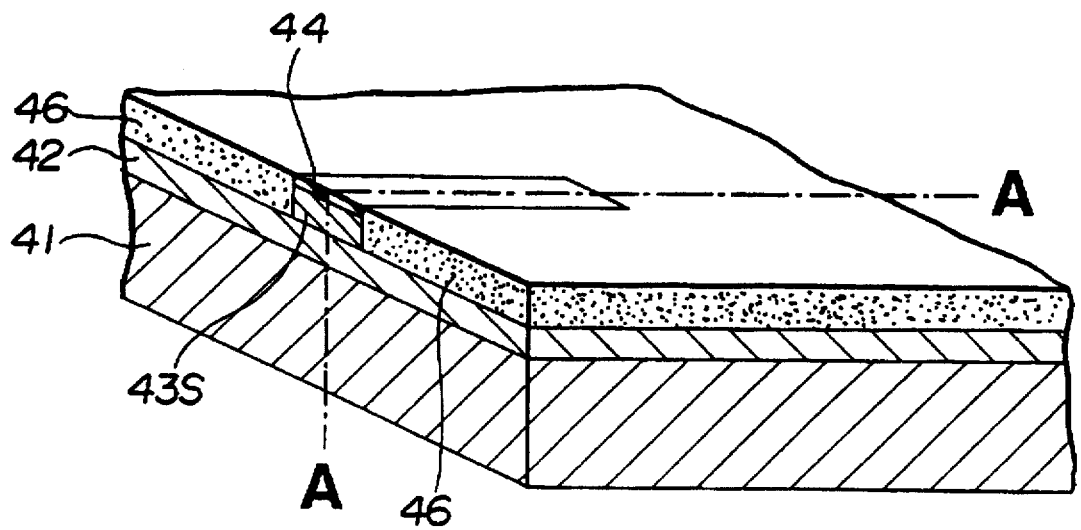
Figure 21:
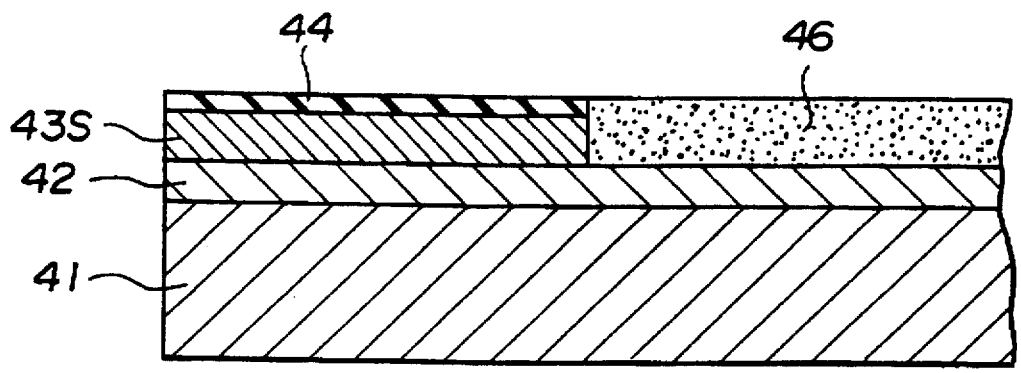

Then, as shown in FIG. 19, a non-magnetic insulating layer 46 is formed for overlying the photoresist 45, protective layer 44 and the magnetoresistance effect element 43S, while the photoresist 43 is left intact. Subsequently, the photoresist 45 is peeled and removed, along with the non-magnetic insulating layer 46 formed on the photoresist 46. After removing the photoresist 45 and the non-magnetic insulating layer 46, the surface of the non-magnetic insulating layer 46 and the protective layer 44 is planarized by polishing. In this manner, the magnetoresistance effect element 43S and the protective layer 44 are buried in the non-magnetic insulation layer 46, as shown in FIG. 20 and in FIG. 21 showing the cross-section along line A—A in FIG. 20.

With the so-called lift-off method, in which the photoresist 45 is peeled and removed along with the non-magnetic insulating layer 46 formed thereon, the state in which the magnetoresistance effect element 43S and the protective layer 44 are buried in the non-magnetic insulation layer 46 may be realized very easily. However, with the lift-off method, there are occasions wherein surface roughness is produced due to burrs produced in the edge portions on peeling the photoresist, thus affecting magnetic properties or insulating properties of the magnetoresistance effect element 43S or worsening the shape of the upper gap layer or the upper shielding layer formed during the subsequent step. Thus it is preferred that, after peeling the photoresist 45, the surfaces of the non-magnetic insulating layer 46 and the protective layer 44 be polished for improving the surface state.

If the surfaces of the non-magnetic insulating layer 46 and the protective layer 44 are polished after peeling the photoresist 45, the film thickness of the protective layer 44 should be previously thickened for taking into account the amount of polishing in the main process. If $Al_2O_3$ is used as a material for the protective layer 44, the ultimate film thickness on the order of 20 nm is desirable. Moreover, the polishing amount on the order of 50 nm is required for sufficiently planarizing the surface by polishing in the main process. Thus, if the photoresist 45 is peeled and subsequently the surfaces of the non-magnetic insulating layer 46 and the protective layer 44 are polished, the protective layer 44 of, for example, $Al_2O_3$, is previously formed to a film thickness on the order of 70 nm, and the film surface is then planarized by polishing on the order of 50 nm by the main process for providing the ultimate film thickness of the protective layer 44 on the order of 20 nm.

By polishing the surfaces of the non-magnetic insulating layer 46 and the protective layer 44 in this manner, not only the magnetic characteristics and insulating properties of the magnetoresistance effect element 43S may be improved, but also the upper shield layer to be formed by the subsequent process may approach to the ideal shape. In addition, the frequency characteristics of the MR head may also be improved.

Figure 22:
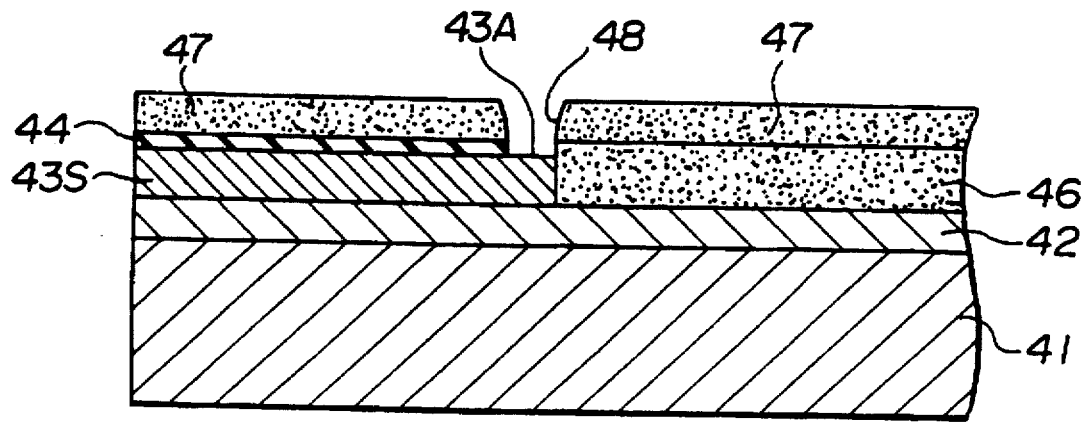

Then, as shown in FIG. 22, a new non-magnetic insulating layer 47 is formed on the non-magnetic insulating layer 46 and the protective layer 44 and subsequently the protective layer 44 and the non-magnetic insulating layer 47 on the rear end 43A of the magnetoresistance effect element 43S are etched for forming an aperture 48 for exposing the rear end 43A of the magnetoresistance effect element 43S.

Figure 23:
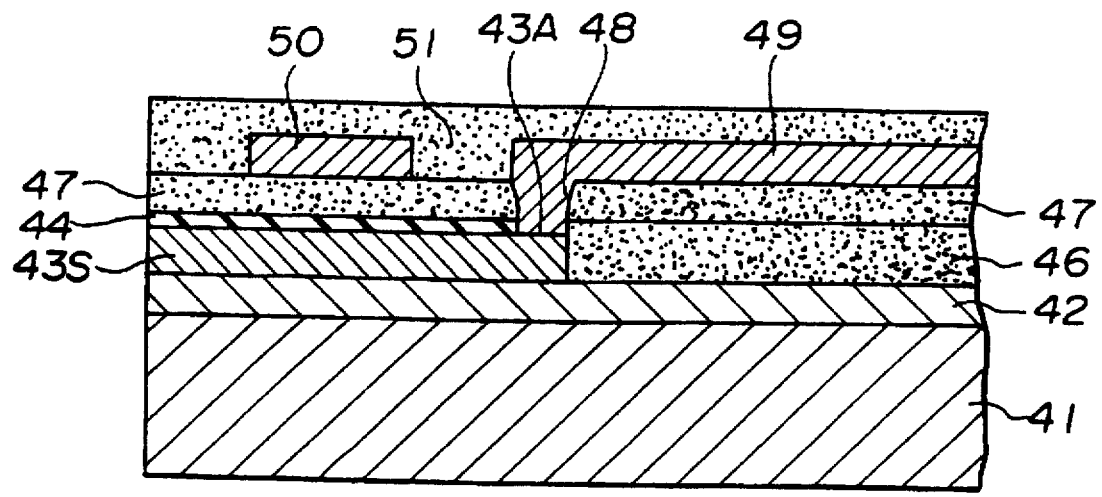

Then, as shown in FIG. 23, a conductor layer for the sense current 49 is formed on the rear end 43A of the magnetoresistance effect element 43S and on the non-magnetic insulating layer 47, so that the conductor layer will be connected to the upper surface of the magnetoresistance effect element 43S via the aperture 48 formed in the previous step. In addition, a conductor layer for the bias current 50 is formed on the non-magnetic insulating layer 47 for overlying the magnetoresistance effect element 43S. On these layers, a non-magnetic insulating layer 51 is further formed.

Figure 24:
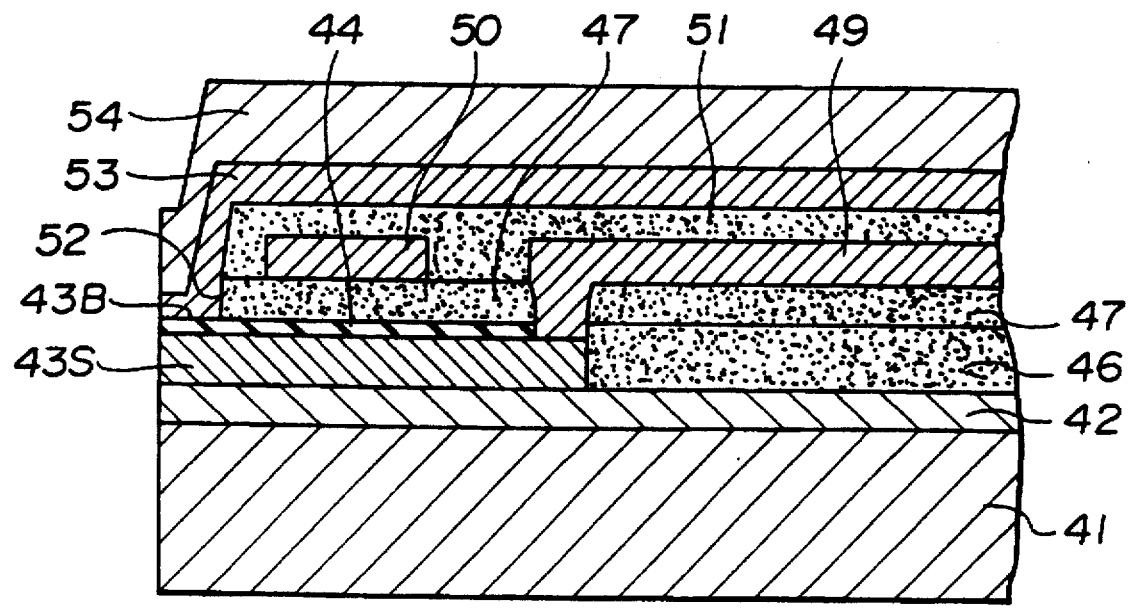

Then, as shown in FIG. 24, the non-magnetic insulating layer 51, non-magnetic insulating layer 47 and the protective layer 44 on a leading end 43B of the magnetoresistance effect element 43S are etched for forming an aperture 52 for exposing the leading end 43B of the magnetoresistance effect element 43S. An upper gap layer 53 is formed on the leading end 43b of the magnetoresistance effect element 43S and the non-magnetic insulating layer 51 so as to be connected to the upper surface of the magnetoresistance effect element 42S via the aperture 52, and a upper shield layer 54 is further formed thereon.

After the above steps, the resulting structure is sliced to form MR heads. Since the MR head is a read-only magnetic head, an inductive head for recording may be layered on the MR head for providing a recording/reproducing magneto head.

With the above-described method for producing the MR head, the non-magnetic insulating layer 46 is formed, with the photoresist 45 being left intact, so that the magnetoresistance effect element 43S and the protective layer 44 will be buried in the non-magnetic insulating layer 46, and subsequently the photoresist 45 is removed along with the non-magnetic insulating layer 46 on the photoresist 45, as shown in FIGS. 20 and 21. However, any other technique than that described above may be used for producing the state in which the magnetoresistance effect element 43S and the protective layer 44 are buried in the non-magnetic insulating layer 46.

Specifically, the non-magnetic insulating layer may be first formed on the lower gap layer 42, the magnetoresistance effect element 43S and the protective layer 44, and the non-magnetic insulating layer may then be etched back, in order to produce such a state in which the magnetoresistance effect element 43S and the protective layer 44 are buried in the non-magnetic insulating film.

Figure 25:
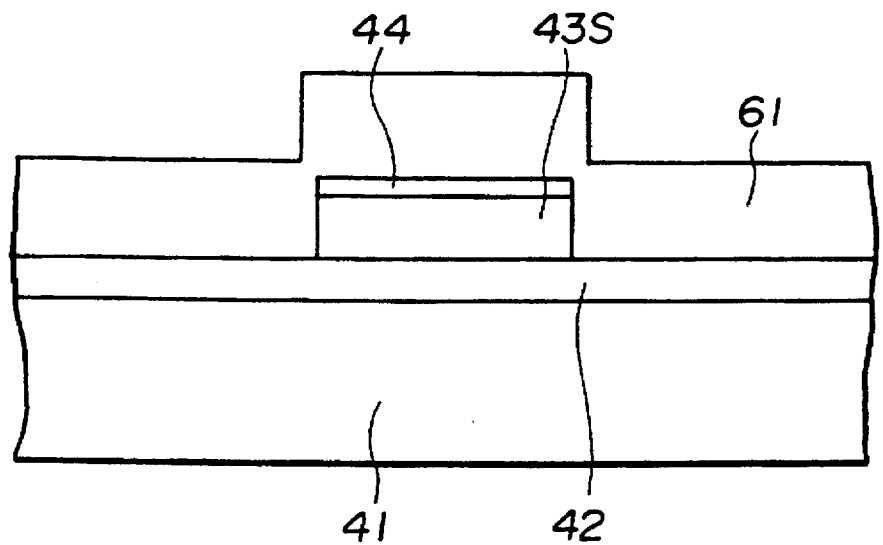
FIGS. 25 to 27 illustrate another production process of the MR head shown in FIG. 1, where
Figure 26:
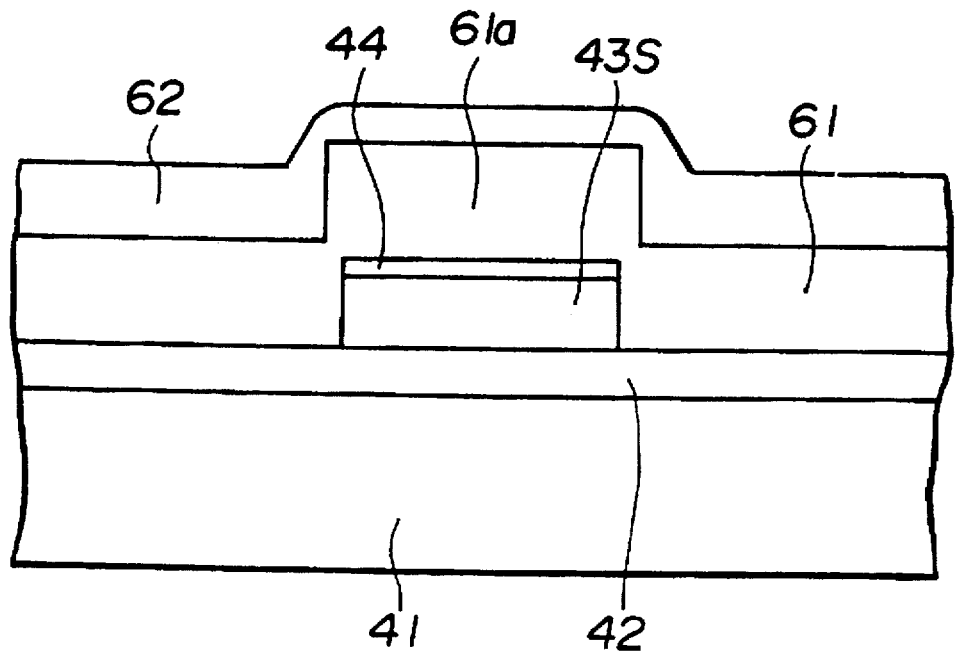

That is, after forming the magnetoresistance effect element 43S and the protective layer 44 as shown in FIG. 18, and removing the photoresist 45, a non-magnetic insulating layer 61 is formed for overlying the lower gap layer 42, magnetoresistance effect element 43S and the protective layer 44, as shown in FIG. 25 which is a view looking from the surface of the MR head along which slides the magnetic recording medium. Then, as shown in FIG. 26, a photoresist 62 is coated on the non-magnetic insulating layer 61. The photoresist 62 is coated to a thickness substantially equal to or slightly smaller than the film thickness of the magnetoresistance effect element 43S in portions other than that overlying the magnetoresistance effect element 43S. As a result, the film thickness of the photoresist 62 becomes thicker in portions other than the portions overlying the magnetoresistance effect element 43S, while becoming thinner in the portion overlying the magnetoresistance effect element 43S. With the entire surface being coated with the photoresist 62, the entire surface is etched for etchback. The etching rate for the photoresist 62 and the non-magnetic insulating layer 61 are selected suitably and the non-magnetic insulating layer 61a on the magnetoresistance effect element 43S and the protective layer 44 is selectively etched for reducing surface step differences for planarization.

As a result, the state is reached in which the surface is planarized and both the magnetoresistance effect element 43S and the protective layer 44 are buried in the non-magnetic insulating layer 61. The next following steps are the same as those described in connection with the above-described MR head.

Figure 27:
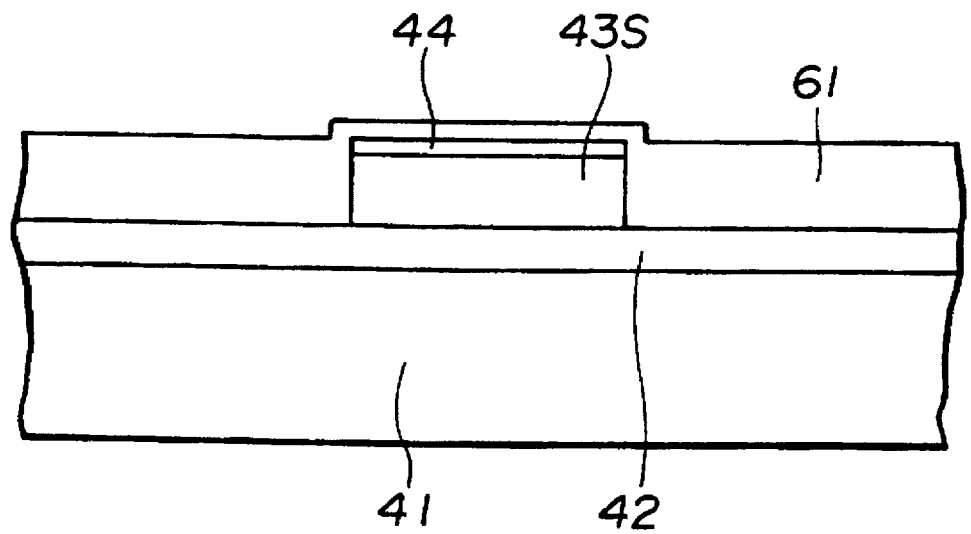

For etchback, it is insufficient if the surface is substantially planarized, while the non-magnetic insulating layer 61 may be left on the protective layer 44, as shown in FIG. 27. If the non-magnetic insulating layer 61 is left on the protective layer 44, as shown in FIG. 27, the non-magnetic insulating layer 61. overlying the aperture 48 for interconnecting the conductor layer 49 for the sense current and the magneto-resistance effect element 43S and the aperture 52 for interconnecting the upper gap layer 53 and the magnetoresistance effect element 43S may be removed along with the protective layer 44 for forming the apertures 48, 52 in the subsequent step.

Alternatively, for producing the state in which the magnetoresistance effect element 43S and the protective layer 44 are buried in the non-magnetic insulating layer, the non-magnetic insulating layer may be formed on the lower gap layer 42, magnetoresistance effect element 43S and the protective layer 44, after which the non-magnetic insulating layer may be polished.

Figure 28:
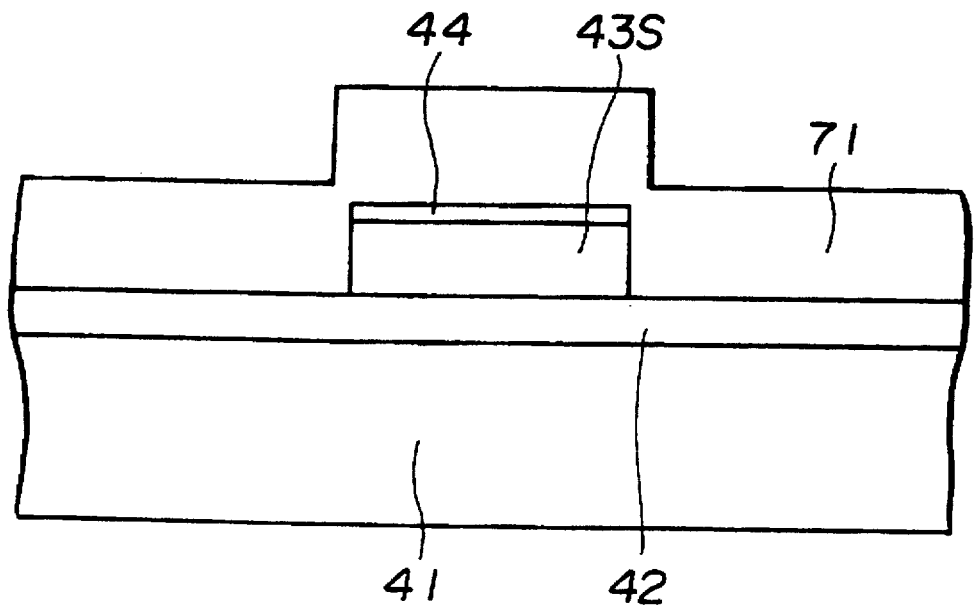
FIG. 28 illustrates still another production process of the MR head shown in FIG. 1, showing the state in which a non-magnetic insulating layer has been formed on the lower gap layer, the magnetoresistance effect element and on the protective layer.
Figure 29:
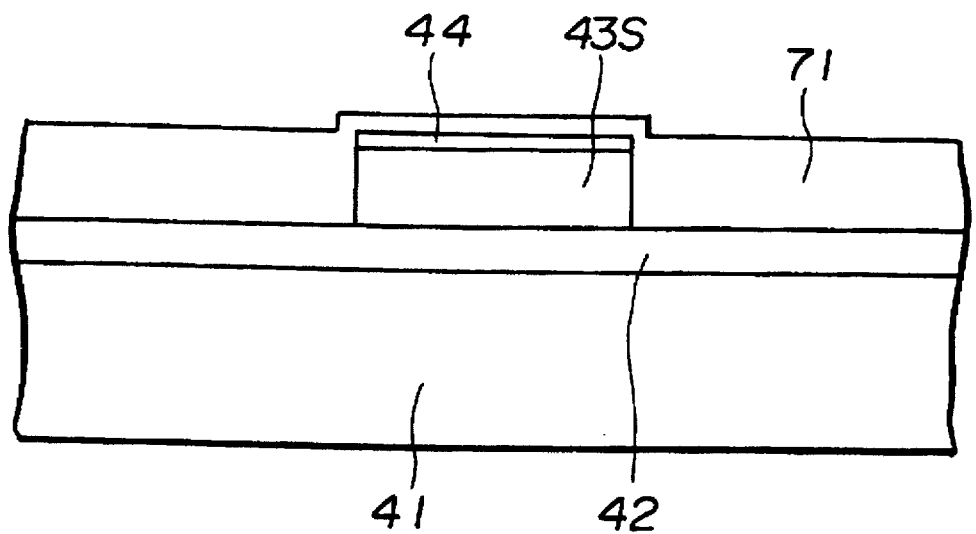
FIG. 29 shows the step next to the step of FIG. 28 and shows the state in which the surface has been planarized by surface grinding.

That is, after forming the magnetoresistance effect element 43S and the protective layer 44 as shown in FIG. 18, and removing the photoresist 45, a non-magnetic insulating layer 71 is formed for overlying the lower gap layer 42, magnetoresistance effect element 43S and the protective layer 44, as shown in FIG. 28 which is a view looking from the surface of the MR head along which slides the magnetic recording medium. Then, as shown in FIG. 29, the entire surface is ground for diminishing surface step differences for planarization. This produces a state in which the surface is substantially planarized and both the magnetoresistance effect element 43S and the protective layer 44 are buried in the non-magnetic insulating layer 61. The next following steps are the same as those described in connection with the above-described MR head.

For polishing the non-magnetic insulating layer 71 in this manner, it is insufficient if the surface is substantially planarized, while the non-magnetic insulating layer 71 may be left on the protective layer 44, as shown in FIG. 29. If the non-magnetic insulating layer 71 is left on the protective layer 44, as shown in FIG. 29, the non-magnetic insulating layer 71 overlying the aperture 48 for interconnecting the conductor layer 49 for the sense current and the magnetoresistance effect element 43S and the aperture 52 for interconnecting the upper gap layer 53 and the magnetoresistance effect element 43S may be removed along with the protective layer 44 for forming the apertures 48, 52 in the subsequent step.

We claim:

1. A thin-film magnetic head comprising:
    a sliding surface;
    a magneto-resistance effect element extending from said sliding surface and formed of (1) a magnetoresistance effect stabilizing layer inclusive of a hard magnetic layer, (2) a non-magnetic insulating layer formed of an electrically insulating non-magnetic material and having a thickness of not less than 10 nm, and (3) a magnetoresistance effect layer inclusive of a magnetoresistance effect film, layered together, the magnetoresistance effect layer and magnetoresistance stabilizing layer being magneto-statically coupled;
    non-magnetic insulating layers arranged on opposite lateral surfaces of said magnetoresistance effect element; and
    a pair of electrodes respectively connected to said magnetoresistance effect layer on opposite ends of an upper surface of said magneto-resistance effect element;
    wherein playback signals are detected by the magnetoresistance effect of said magnetoresistance effect layer.

2. The thin-film magnetic head as claimed in claim 1 wherein the magnetoresistance effect stabilizing layer is formed by a hard magnetic film and a soft magnetic film layered together.

3. The thin-film magnetic head as claimed in claim 1 wherein the saturation magnetic flux of said magnetoresistance effect stabilizing layer is greater than that of said magnetoresistance effect layer.

4. The thin-film magnetic head as claimed in claim 1 wherein the thickness of said magnetoresistance effect stabilizing layer is larger than that of said magnetoresistance effect layer.

5. The thin-film magnetic head as claimed in claim 1 wherein said magnetoresistance effect layer is comprised of a magnetoresistance effect film formed on an underlying thin film.

6. A thin-film magnetic head comprising:

a sliding surface;

a magneto-resistance effect element extending from said sliding surface and formed of (1) a magnetoresistance effect stabilizing layer inclusive of a diamagnetic layer, (2) a non-magnetic layer formed of an electrically insulating non-magnetic material and having a thickness of not less than 10 nm, and (3) a magnetoresistance effect layer inclusive of a magnetoresistance effect film, layered together, the magnetoresistance effect layer and magnetoresistance stabilizing layer being magneto-statically coupled;

non-magnetic insulating layer arranged on opposite lateral surfaces of said magnetoresistance effect element; and a pair of electrodes respectively connected to said magnetoresistance effect layer on opposite ends of an upper surface of said magneto-resistance effect element;

wherein playback signals are detected by the magnetoresistance effect of said magnetoresistance effect layer.

7. The thin-film magnetic head as claimed in claim 6 wherein the magnetoresistance effect stabilizing layer is formed by a diamagnetic film and a magnetic film layered together.

8. The thin-film magnetic head as claimed in claim 6 wherein the saturation magnetic flux of said magnetoresistance effect stabilizing layer is greater than that of said magnetoresistance effect layer.

9. The thin-film magnetic head as claimed in claim 6 wherein the thickness of said magnetoresistance effect stabilizing layer is larger than that of said magnetoresistance effect layer.

10. The thin-film magnetic head as claimed in claim 6 wherein said magnetoresistance effect layer is comprised of a magnetoresistance effect film formed on an underlying thin film.

* * * * *